US008467985B2

(12) United States Patent
Bickel

(10) Patent No.: US 8,467,985 B2
(45) Date of Patent: Jun. 18, 2013

(54) AUTOMATED SYNCHRONIZATION OF DATA BETWEEN ELECTRICAL GRIDS

(75) Inventor: Jon A. Bickel, Murfreesboro, TN (US)

(73) Assignee: Schneider Electric USA Inc., Palatine, IL (US)

( * ) Notice: Subject to any disclaimer, the term of this patent is extended or adjusted under 35 U.S.C. 154(b) by 649 days.

(21) Appl. No.: 12/262,802

(22) Filed: Oct. 31, 2008

(65) Prior Publication Data

US 2010/0111112 A1    May 6, 2010

(51) Int. Cl.
*G01R 23/02*    (2006.01)

(52) U.S. Cl.
USPC ............................................. 702/75; 307/64

(58) Field of Classification Search
USPC .............................................. 702/75; 307/64
See application file for complete search history.

(56) References Cited

U.S. PATENT DOCUMENTS

| | | | |
|---|---|---|---|
| 3,973,087 A | 8/1976 | Fong | |
| 5,874,903 A | 2/1999 | Shuey et al. | |
| 5,949,662 A * | 9/1999 | Boldin et al. | 363/37 |
| 5,978,371 A | 11/1999 | Mason, Jr. et al. | |
| 6,020,657 A | 2/2000 | Liran | |
| 6,100,817 A | 8/2000 | Mason, Jr. et al. | |
| 6,288,456 B1 | 9/2001 | Cratty | |
| 6,574,672 B1 | 6/2003 | Mitchell et al. | |
| 6,694,125 B2 | 2/2004 | White et al. | |
| 6,731,904 B1 | 5/2004 | Judd | |
| 7,065,350 B2 | 6/2006 | Capobianco et al. | |
| 7,079,808 B2 | 7/2006 | Striemer | |
| 2004/0032168 A1 * | 2/2004 | Allison et al. | 307/64 |
| 2004/0121648 A1 | 6/2004 | Voros | |
| 2005/0200205 A1 | 9/2005 | Winn et al. | |
| 2006/0167569 A1 | 7/2006 | Colombi et al. | |
| 2006/0271244 A1 | 11/2006 | Cumming et al. | |

(Continued)

FOREIGN PATENT DOCUMENTS

| | | |
|---|---|---|
| WO | WO 03/030396 A2 | 4/2003 |
| WO | WO 2004/032371 A1 | 4/2004 |
| WO | WO 2005/055478 A1 | 6/2005 |

OTHER PUBLICATIONS

Written Opinion corresponding to co-pending International Patent Application Serial No. PCT/US2009/061765, European Patent Office; dated Feb. 16, 2010; 7 pages.

(Continued)

*Primary Examiner* — Jonathan C Teixeira Moffat
*Assistant Examiner* — Regis Betsch
(74) *Attorney, Agent, or Firm* — Nixon Peabody LLP

(57) ABSTRACT

A method and system of automatically correlating data measured by monitoring devices that monitor first and second electrical grids. The second electrical grid producing alternating current signals that are electrically isolated from alternating current signals produced by the first electrical grid. An example power monitoring device includes a controller, a first monitoring device interface and a second monitoring device interface. The first monitoring device interface is coupled to a first monitoring device in the first electrical grid and the second monitoring device interface is coupled to a second monitoring device in the second electrical grid. A first counter stores data counts of occurrences from the first electrical grid. A second counter stores data counts of occurrences from the second electrical grid. A synchronization monitoring algorithm automatically synchronizes the first and second counters by associating a data count from the first counter with a data count from the second counter with a time from either the first or second grid corresponding to the occurrence of an event on either the first or the second electrical grid or both.

20 Claims, 5 Drawing Sheets

U.S. PATENT DOCUMENTS

| | | | |
|---|---|---|---|
| 2007/0005275 A1 | 1/2007 | Bickel et al. | |
| 2007/0014313 A1* | 1/2007 | Bickel et al. | 370/503 |
| 2007/0179726 A1 | 8/2007 | Bickel | |
| 2007/0206521 A1 | 9/2007 | Osaje | |
| 2007/0236359 A1 | 10/2007 | Wynans et al. | |
| 2008/0065712 A1 | 3/2008 | Bickel | |

OTHER PUBLICATIONS

International Search Report corresponding to co-pending International Patent Application Serial No. PCT/US2009/061765, European Patent Office; dated Feb. 16, 2010; 5 pages.

* cited by examiner

AUTOMATED SYNCHRONIZATION OF DATA BETWEEN ELECTRICAL GRIDS

FIELD OF THE INVENTION

The present invention relates generally to utility monitoring systems, and, in particular, to data synchronization between multiple electrical grid systems.

BACKGROUND OF THE INVENTION

Since the introduction of electrical power distribution systems in the late 19th century, there has been a need to monitor their operational and electrical characteristics. The ability to collect, analyze, and respond to information from an electrical power system can improve safety, minimize equipment loss, decrease scrap, and ultimately save time and money. To that end, monitoring devices were developed to measure and report such information. With the dawn of the electronics age, the quality and quantity of data from monitoring devices was vastly improved, and communications networks and software were developed to collect, display, and store information.

All real-world electrical signals on power systems experience subtle changes in their frequency and amplitude over time. This modulation of the power signal's frequency and amplitude are both indeterminate and unique with respect to time. Each device located on the same electrical grid will simultaneously experience the same frequency fluctuations during steady-state load conditions. Devices that are directly linked to each other in their hierarchy will see stronger correlations in their amplitude modulation. Both the frequency and amplitude modulation of the signal may then be used to precisely synchronize the data from one device with respect to another device (or all devices to each other).

Currently, data synchronization features such as that described in U.S. Pat. No. 7,684,441, and U.S. Pat. No. 8,024,390, allow all devices on a monitoring system to be synchronized to the zero-crossing of all three phase voltages without the use of additional hardware. Potential phase shifts between various devices can also be detected with these systems. Once the devices are synchronized with each other, the system data is essentially synchronized with respect to the time it occurred making more complex data analysis feasible.

The need to synchronize data across different power monitoring systems or electrical grids is becoming more commonplace as the sophistication of electrical systems evolve. Synchronizing monitoring system data allows users to determine how an event propagates through their electrical system, how it affects equipment, and potentially how to mitigate reoccurrences. One example of monitoring equipment is the ProActiveLogic® technologies available from Schneider Electric, which provides more extensive data synchronization opportunities in applications (Data Centers, Islanding Systems, et al.) that heretofore required GPS timestamping (along with the associated GPS equipment, installation and configuration costs).

Sophisticated processing capabilities in digital monitoring devices allow large amounts of complex electrical data to be derived and accumulated from a seemingly simple electrical signal in individual utility systems. Because of the data's complexity, quantity, and ostensibly disjointed relationship from one monitoring device to the next (and one electrical grid to the next), manual analysis of all the data is an enormous effort that often requires experts to be hired to complete the task. This process is tedious, complicated, prone to error and oversight, and time-consuming. A partial solution has been to use global positioning satellite (GPS) systems to timestamp an event between different electrical grids, but this approach requires that the user purchase and install additional hardware and data lines to link the monitoring devices of different electrical grids together. And this solution still requires the evaluation of large amounts of data because the system data is only in temporal context; not in spatial context. Synchronizing data using GPS systems may be disadvantageous because of temporal latencies associated with other hardware in the system. Furthermore, any alignment of data by a GPS-based system can only be as accurate as the propagation delay of the GPS signal, which means that the data still may not be optimally aligned when a GPS system is used.

Systems that use large uninterrupted power supplies (UPS) such as data centers for example use multiple independent electrical "grids"; in this case the electrical utility grid and the "UPS grid." Because these electrical grids are intentionally isolated from each other and move independently from each other (in the electrical sense), data synchronization using existing monitoring technologies such as the existing Schneider ProActiveLogic® technologies is impractical. What is needed, therefore, is a method to automatically and inexpensively perform precise data synchronization between multi-grid electrical systems.

SUMMARY OF THE INVENTION

Briefly, a method of automatically associating data measured by monitoring devices that monitor independent electrical grids is disclosed. A first signal data from a first set of monitoring devices that are monitoring a first electrical grid is received at a master synchronization device. The first signal data represents at least frequency variations measured by respective ones of the first monitoring devices for a predetermined number of occurrences. The frequency variations measured by each of the first monitoring devices are automatically synchronized in the master synchronization device, and produce a first occurrence counter that counts a periodic occurrence in the synchronized frequency variations associated with the first monitoring devices. A second signal data from a second set of monitoring devices that are monitoring a second electrical grid are received by the master synchronization device. The second electrical grid produces alternating current signals that are electrically isolated from alternating current signals produced by the first electrical grid. The second signal data represents at least frequency variations measured by respective ones of the second monitoring device for a predetermined number of occurrences. The frequency variations measured by each of the second monitoring devices are automatically synchronized in the master synchronization device and produce a second occurrence counter that counts a periodic occurrence in the synchronized frequency variations associated with the second monitoring devices. A first count of the first occurrence counter is automatically associated with a second count of the second occurrence counter. The first count and the second count temporally correspond to an electrical event in the first electrical grid or the second electrical grid or both.

Another example is a power monitoring device for associating data between a first and second electrical grid. The second electrical grid produces alternating current signals that are electrically isolated from alternating current signals produced by the first electrical grid. The power monitoring device includes a controller, a first monitoring device interface coupled to a first monitoring device in the first electrical grid and a second monitoring device interface coupled to a second monitoring device in the electrical utility grid. A first counter corresponding to data counts of occurrences from the first electrical grid is provided. A second counter corresponding to data counts of occurrences from the second electrical grid is provided. A synchronization monitoring algorithm automatically synchronizes the first and second counters by associating a data count from the first counter with a data count from the second counter with a time from either the first or second electrical grid corresponding to the occurrence of an event on either the first or the second electrical grid or both.

Another example disclosed is a machine readable medium having stored thereon instructions for associating data measured from a first and a second electrical grid. The second electrical grid produces alternating current signals that are electrically isolated from alternating current signals produced by the first electrical grid. The machine readable medium includes machine executable code, which when executed by at least one machine, causes the machine to receive first signal data from a first monitoring device monitoring the first electrical grid. The first signal data represents frequency variations measured by the first monitoring device for a predetermined number of occurrences. The code causes the machine to receive second signal data from a second monitoring device monitoring the second electrical grid. The second signal data represents at least frequency variations measured by the second monitoring device for a predetermined number of occurrences. The code causes the machine to determine a first occurrence count corresponding to one of the frequency variations measured by the first monitoring device. The code causes the machine to determine a second occurrence count corresponding to the one of the frequency variations measured by the second monitoring device. The code causes the machine to associate the first occurrence count with the second occurrence count based on a time measurement of an event occurring in either the first or second electrical grid or both.

The foregoing and additional aspects will be apparent to those of ordinary skill in the art in view of the detailed description of various embodiments, which is made with reference to the drawings, a brief description of which is provided next.

BRIEF DESCRIPTION OF THE DRAWINGS

The foregoing and other advantages will become apparent upon reading the following detailed description and upon reference to the drawings.

Figure 1:
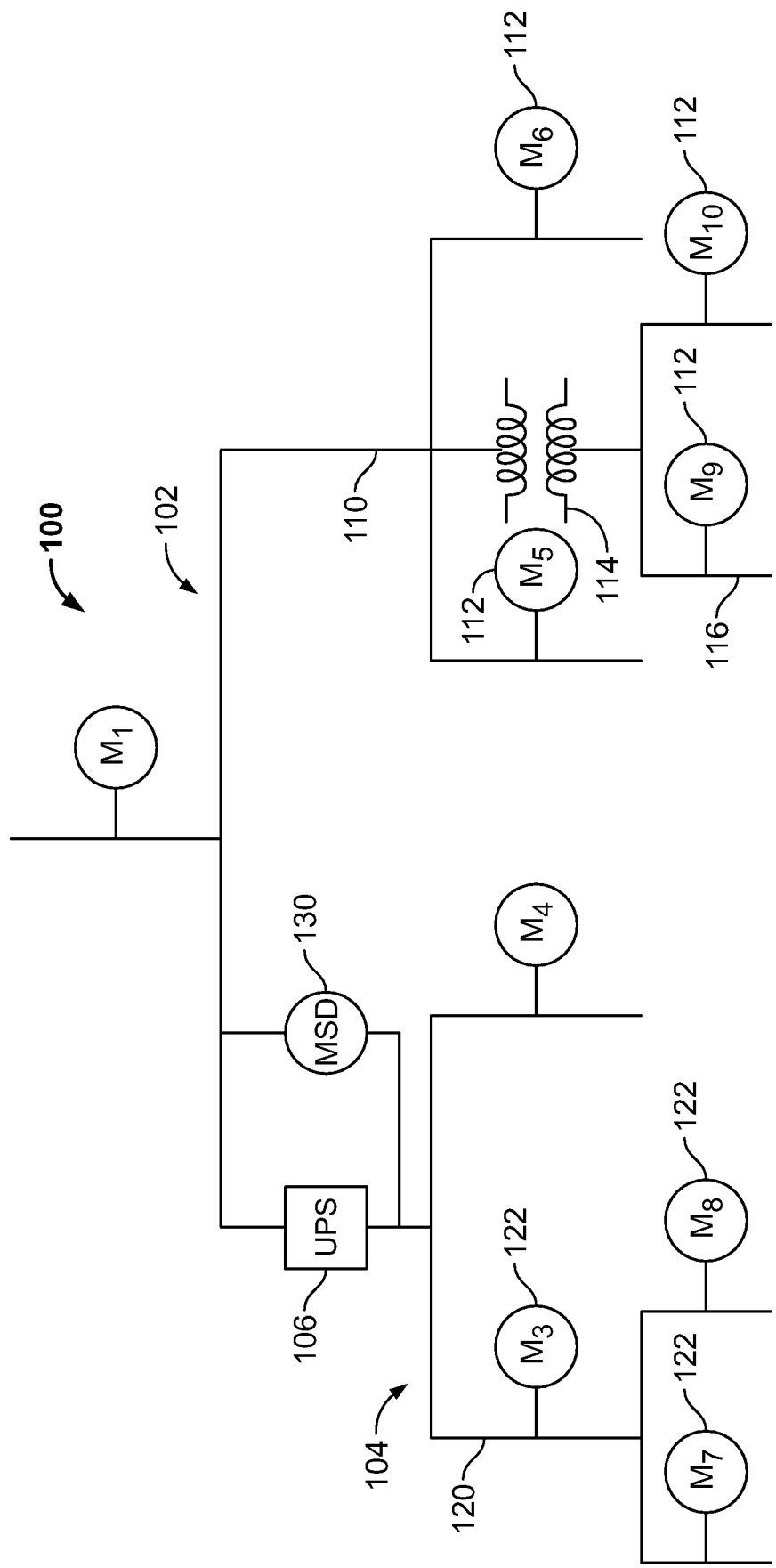
FIG. 1 is a block diagram of an electrical system that may be viewed as a multi-grid electrical system having a master synchronization device (MSD) allowing the correlation of monitored data between at least two electrical grids.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE ILLUSTRATED EMBODIMENTS

An electrical system grid is an interconnected network of conductors used to distribute energy from a source(s) to its respective loads. For example, electrical utility grids distribute energy from power plants to homes and businesses across the country much like roads provide paths for vehicles to travel from their origination to their destination. Electrical utility grids are owned and operated by hundreds of utility companies across the country. Three major electrical utility grids operate in North America: the Eastern Interconnection, the Western Interconnection, and the ERCOT (Electric Reliability Council of Texas) Interconnection. Although these electrical grids are connected to each other at various points through high voltage direct current (HVDC) links, they operate electrically independent from each other. In other words, each electrical utility grid produces alternating current signals that are electrically isolated from alternating current signals produced by other electrical utility grids. Because these electrical grids are electrically independent from each other, there is no correlative relationship between their grid frequencies.

Carrying the "electrical grid" concept a step further, it is possible to have two or more independent electrical systems within the same facility as shown in the electrical system 100 in FIG. 1. FIG. 1 is a block diagram of an electrical system 100 with multiple electrical grids 102 and 104. Some energy consumers may use a combination of energy sources in separate electrical grids to attain their energy and reliability objectives as shown in the multiple electrical grid system 100. During various operational modes of these electrical systems, two or more independent electrical grids such as the electrical utility grid 102 and the UPS grid 104 in FIG. 1 may be employed. For instance, Tier 2-4 data centers use electrical utility feeds as their primary energy source; however, they also use other sources including diesel generators and uninterruptible power supplies (UPSs) such as the UPS 106 in FIG. 1 to provide a redundant energy source to their critical loads. Other examples of energy consumers requiring a redundant energy source include health care facilities, medical centers, and/or hospitals. Some types of UPSs (e.g., double conversion on-line) are fed by an electrical utility source, but their output electrical characteristics (including frequency) may be completely independent from the electrical utility source and therefore produce AC signals that are electrically isolated from those produced by the electrical utility source. For example, a double conversion on-line UPS first rectifies (converts to DC) the electrical utility input source and then inverts (converts to AC) the DC output of the same rectifier to provide a truly isolated energy source.

Electrical systems using some types of UPSs are inherently isolated from the electrical utility grid, resulting in a unique electrical grid with independent electrical characteristics. For example, Motor-Generator (M-G) sets provide complete line isolation via a mechanical link between one electrical grid and another, and are used to convert frequency, voltage, and phase of power. There are other methods and techniques of isolating energy sources from each other with the end result being a separate electrical grid. Because these electrical grids are separated from each other through some means, their respective grid frequency may also be independent from one another (depending on how the output frequency of the separating method is controlled).

In the multiple electrical grid system 100 in FIG. 1, the UPS grid 104 is electrically isolated from the electrical utility grid 102. Although these two grids are electrically isolated, the electrical utility grid 102 may provide energy to the UPS grid 104 in this example. The electrical utility grid 102 includes a hierarchical series of electrical feeders and branches 110 and has multiple monitoring devices 112 that provide data which may be communicated with by an automated data synchronization system and an automated hierarchy classification system (not shown). The electrical utility grid 102 may include an electrical transformer apparatus 114 that provides voltage reduction to branches 116 that are also monitored by monitoring devices 112. The data from the monitoring devices 112 are synchronized automatically in the automated data synchronization system for the electrical utility grid 102 in accordance with the principles discussed in U.S. application Ser. No. 11/174,099 filed Jul. 1, 2005 and U.S. patent application Ser. No. 11/981,428 filed Oct. 1, 2007, both hereby incorporated by reference. The UPS grid 104 is coupled to the electrical utility grid 102 through the UPS 106 and provides energy into a hierarchical series of electrical feeders and branches 120 with multiple monitoring devices 122. The UPS 106 provides electrical isolation between the electrical utility grid 102 and the UPS grid 104. The monitoring devices 112 and 122 in the electrical utility grid 102 and the UPS grid 104 can be any form of monitoring device including preferably an intelligent electronic device (IED) such as the PowerLogic® line of products available from Schneider Electric.

As shown in FIG. 1, the two independent electrical grids 102 and 104 exist assuming that the UPS 106 employs some form of double conversion of its applied energy by first converting the source energy from the electrical utility grid 102 to DC, then inverting the DC back to AC resulting in a truly isolated source.

As explained above, the UPS grid 104 is the electrical infrastructure downstream from the UPS 106, and the electrical utility grid 102 is all remaining electrical infrastructures within the utility system 100. Because, they are isolated from each other, the electrical utility grid 102 and UPS grid 104 may operate at different frequencies and/or different phase angles from each other, and thus, may not be synchronized with each other. In order to synchronize data from the two electrical grids 102 or 104 together without GPS time synchronization, a master synchronization device (MSD) 130 is interposed between the electrical grids 102 and 104 to evaluate frequency data from the grids 102 and 104. The two electrical grids 102 and 104 are placed into temporal context with each other via the master synchronization device (MSD) 130 and thus data from both electrical grids 102 and 104 may be interrelated to each other.

Figure 2:
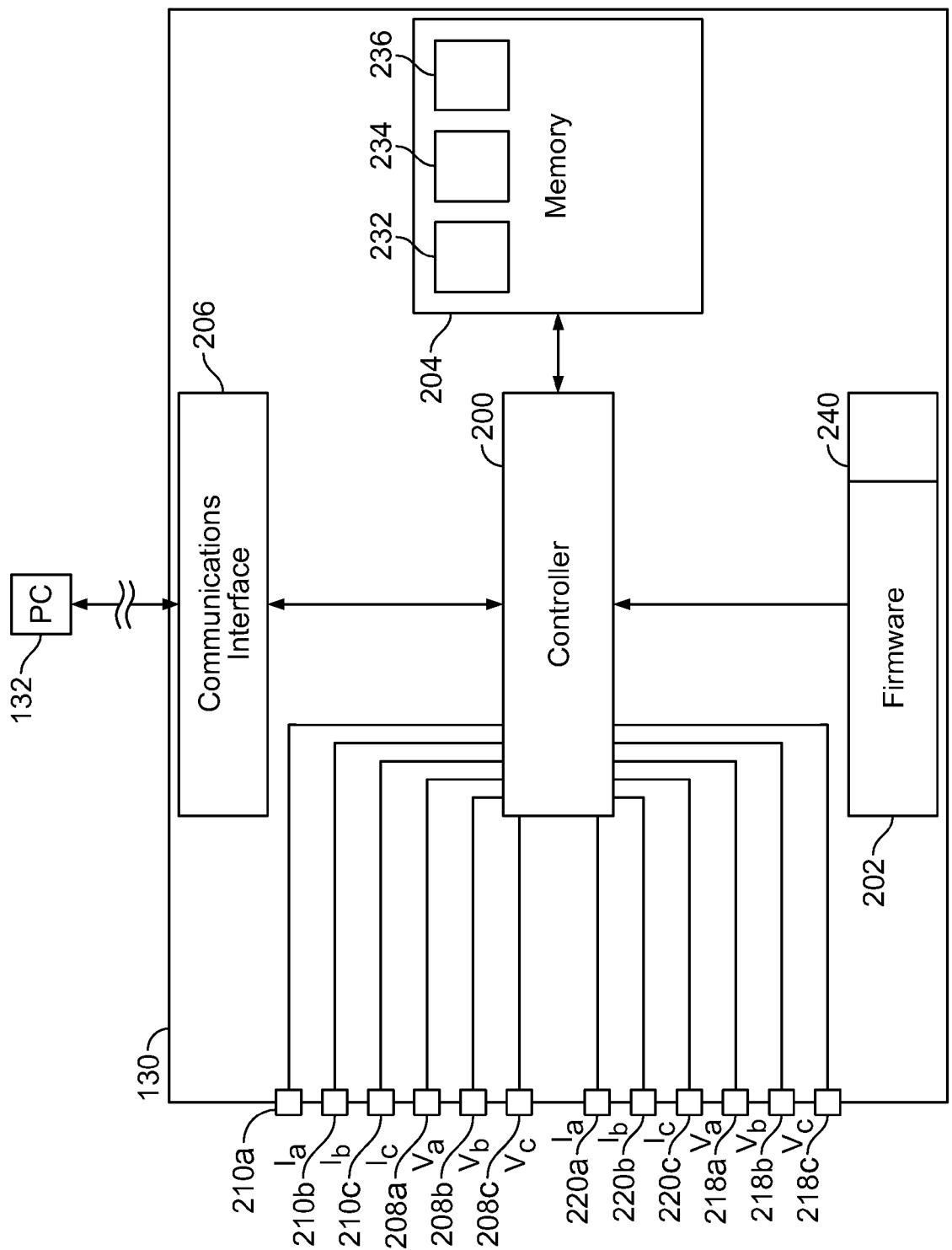
FIG. 2 is a functional block diagram of the master synchronization device (MSD) interposed between the electrical grids in FIG. 1.

A functional block diagram of the master synchronization device (MSD) 130 in FIG. 1 is shown in FIG. 2. It is to be understood that either one or both of the monitoring devices 112 or 122 in FIG. 1 can be an intelligent electronic device (IED) serving as a power meter (or electric meter). In this example, the master synchronization device (MSD) 130 can be based on one of the PowerLogic® line of products available from Schneider Electric. The master synchronization device (MSD) 130 includes a controller 200, firmware 202, a memory 204, a communications interface 206, and a first set of three phase voltage inputs 208a,b,c, which connect to the $V_A$, $V_B$, and $V_C$ phase voltage signals, respectively, of the first electrical utility grid 102, and are coupled to the controller 200. A first set of three phase current inputs 210a,b,c, which connect to the $I_A$, $I_B$, and $I_C$ phase current signals, respectively, are optionally coupled to the controller 200. A second set of three phase voltage inputs 218a,b,c, which connect to $V_A$, $V_B$, and $V_C$ phase voltage signals, respectively, of the second utility grid 104, and are coupled to the controller 200. A second set of three phase current inputs 220a,b,c, connect to the $I_A$, $I_B$, and $I_C$ phase current signals, respectively, are optionally coupled to the controller 200. At a minimum the MSD 130 may actually have only two inputs: one from the first electrical grid such as the phase voltage input 208a and one from the second electrical grid such as the phase voltage input 218a. As will be explained, these two signal inputs are enough to synchronize data from the two electrical grids 102, 104.

The memory 204 is accessed by the controller 200 to store and retrieve electrical parameter data measured by the monitoring device 130. In this example, the memory 204 includes a grid signal counter 232 for data from the electrical utility grid 102 in FIG. 1, a grid signal counter 234 for data from the UPS grid 104 in FIG. 1, and optionally a clock 236 that stores time data from either the electrical utility grid 102 or the UPS grid 104. The firmware 202 includes machine instructions for directing the controller 200 to carry out operations performed by the master synchronization device (MSD) 130, which can include monitoring and synchronization functions. Specifically, the firmware 202 includes a master synchronization algorithm 240, 438 that performs synchronization or comparisons of monitored data between the independent electrical grids 102 and 104 in FIG. 1. By "synchronization" in this context, it is meant that the respective grid signal counters temporally correspond to an electrical event that occurred in the first electrical grid, the second electrical grid, or both. Thus, if an electrical event was detected on the first electrical grid 102 at a signal count corresponding to 832, and the same electrical event was detected on the second electrical grid 104 at a signal count corresponding to 940, the two signal counters are associated with one another by the controller 200 so that comparisons among the respective monitored data from the two electrical grids 102, 104 can be made. The communications interface 206 allows data output such as synchronized grid data from the master synchronization device 130 to be communicated to an external device such as a computer 132 for further analysis.

As will be explained below, in order to "connect" the grids 102 and 104 in FIG. 1 for synchronization purposes, a primary voltage source input such as any one of the voltage conductor connectors 208a,b,c and a corresponding auxiliary voltage source input such as any one of the voltage conductor connectors 218a,b,c on the master synchronization device 130 are used to bring the two electrical grid signals from the grids 102 and 104 into the master synchronization device 130, which acts as a form of signal aggregation device for both electrical grids 102 and 104. Coincident signal counts from both electrical grids 102 and 104 are tracked in the master synchronization device 130 using the counters 232 and 234 as the signal counters for each of the electrical grids 102 and 104, which may move independently from each other. Events on each independent electrical grids 102 and 104 are interrelated with each other using the coincident signal count data from the counters 232 and 234 by the master synchronization device 130. The counters can iterate based on any measurable and periodic occurrence in the voltage or current signal being monitored. Preferably, the counters 232, 234 increment each time a positive-going or negative-going zero crossing is detected. Each instance of such a zero-crossing is conventionally called a "cycle," so a cycle count refers to a number of cycles counted since the counter was initialized or reset. However, it is understood that the counters 232, 234 can iterate with any measurable and periodic occurrence in the current or voltage signals being monitored by monitoring devices in each of the electrical grids 102, 104, such as every zero crossing or based on the positive or negative peak of the periodic signal.

In this example, the master synchronization functions are performed within the firmware 202 of an IED 130. However, it is to be understood that the functionality of automated data comparison between the electrical grids 102 and 104 may be provided to existing monitoring hardware via the installation of a master synchronization option module that performs data correlation between the two electrical grids. Such an option module may take the form of an installable card with firmware in the form of the master synchronization algorithm 240. Alternatively, the option module may only contain hardware and be managed by its respective IED's firmware.

The controller 200 includes a central processing unit (CPU), controller or processor, a memory, and an interface system that are coupled together by a bus or other link, although other numbers and types of each of the components and other configurations and locations for the components can be used. The controller 200 can execute a program of stored instructions for one or more aspects of the methods and systems as described herein, including for synchronization of multiple grid data, although the controller can execute other types of programmed instructions. The memory can store these programmed instructions for one or more aspects of the methods and systems as described herein, including the method for synchronizing data from multiple independent electrical grids, although some or all of the programmed instructions can be stored and/or executed elsewhere. A variety of different types of memory storage devices, such as a random access memory (RAM) or a read only memory (ROM) in the system or a floppy disk, hard disk, CD ROM, DVD ROM, or other computer readable medium that is read from and/or written to by a magnetic, optical, or other reading and/or writing system that is coupled to the processor, can be used for the memory. The user input device may comprise a computer keyboard and a computer mouse, although other types and numbers of user input devices can be used. The display may comprise a computer display screen, such as a CRT or LCD screen by way of example only, although other types and numbers of displays can be used.

Although an example of the master synchronization device (MSD) 130 is described and illustrated herein in connection with FIGS. 1-2, the controller 200 can be implemented on any suitable computer system or computing device. It is to be understood that the example devices and systems of the system 100 are for exemplary purposes, as many variations of the specific hardware and software used to implement the system 100 are possible, as will be appreciated by those skilled in the relevant art(s).

Furthermore, each of the devices of the system 100 such as intelligent electronic devices or the monitoring devices 112 and 122 can be conveniently implemented using one or more general purpose computer systems, microprocessors, digital signal processors, micro-controllers, application specific integrated circuits (ASIC), programmable logic devices (PLD), field programmable logic devices (FPLD), field programmable gate arrays (FPGA) and the like, programmed according to the teachings as described and illustrated herein, as will be appreciated by those skilled in the computer, software, and networking arts.

In addition, two or more computing systems or devices can be substituted for any one of the systems in the system 100. Accordingly, principles and advantages of distributed processing, such as redundancy, replication, and the like, also can be implemented, as desired, to increase the robustness and performance of the devices and systems of the system 100. The system 100 can also be implemented on a computer system or systems that extend(s) across any network environment using any suitable interface mechanisms and communications technologies including, for example, telecommunications in any suitable form (e.g., voice, modem, and the like), Public Switched Telephone Network (PSTNs), Packet Data Networks (PDNs), the Internet, intranets, a combination thereof, and the like.

Figure 3:
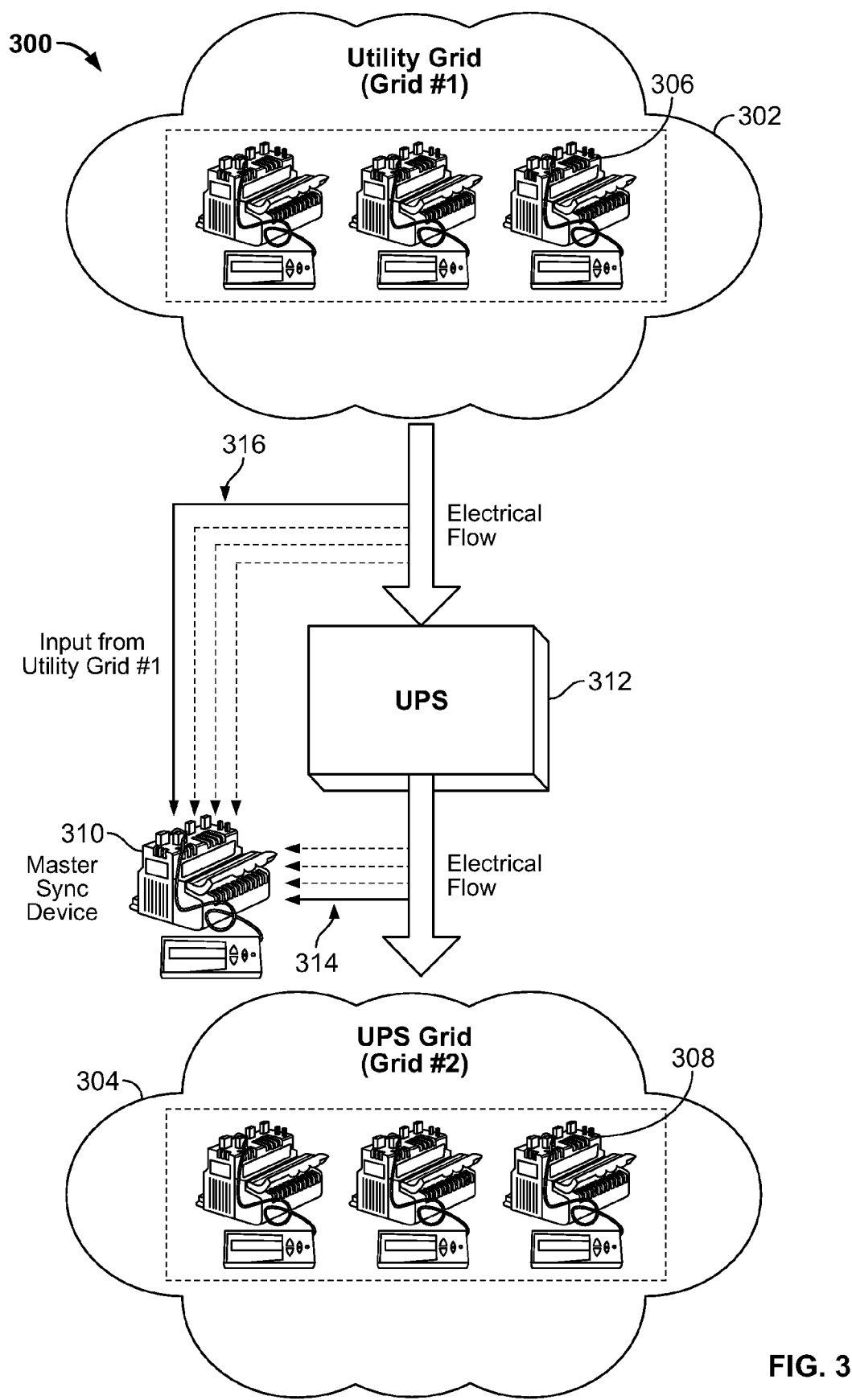
FIG. 3 is a functional block diagram of another multi-grid electrical system providing data synchronization between two electrical grids.

FIG. 3 illustrates another example of a utility system 300 having two independent electrical grids 302 and 304. Each of the independent electrical grids 302 and 304 has respective monitoring devices 306 and 308. The monitoring devices 306 and 308 can each be coupled to an automated data synchronization system (not shown) for each respective electrical grid 302 and 304 to automatically synchronize the data within that electrical grid (i.e., to correlate the respective cycle counts among the monitoring devices 306 with the frequency variations that occur on the utility system 300). Such an automated data alignment system for an individual electrical grid is further described in U.S. Pat. No. 7,684,441 and U.S. Pat. No. 8,024,390, both hereby incorporated by reference. Briefly, the automated data synchronization system takes two sets of monitored data representing frequency variations in the current or voltage signal being monitored by two different monitoring devices. Because these frequency variations will not necessarily correspond to the same signal count in each of the monitoring devices, the automated data alignment system calculates a correlation coefficient at each frequency variation pair in the two sets of data until it finds a maximum correlation coefficient. The respective signal counts in each of the monitoring devices at the point of maximum correlation are associated with one another so that any electrical event or perturbation in the signals being monitored can be tracked and the associated monitored data can be manipulated or processed in a synchronized fashion. The data is now "aligned" in the sense that the algorithm knows the respective signal counts at which the same event or perturbation occurred across the monitoring system.

The system 300 includes an IED 310 that receives input signals 314 and 316 from both the input and output of the uninterrupted power supply (UPS) 312. In this example, the IED 310 may also perform the normal functions of a power monitoring and control device (hence, the use of four conductors) on the UPS grid 304. The IED 310 also receives a signal output 316 from conductors on the utility grid 302. In this example, the IED 310 functions as the master synchronization device (MSD), similar to the master synchronization device 130 shown in FIG. 2. The IED 310 in this example includes algorithms such as the data synchronization algorithm 240 in FIG. 2 allowing it to compare and align data between the independent electrical grids 302 and 304 using signals from both electrical grids 302 and 304. The IED 310 may also use the algorithms previously described in U.S. Pat. No. 7,684,441, and U.S. Pat. No. 8,024,390, both of which are incorporated by reference in order to align the data within each electrical grid 302 or 304.

A key component of the process to compare and synchronize data between multiple electrical grids is the master synchronization device (MSD) 130 in FIGS. 1-2 or the multifunctional intelligent electronic device 310 in FIG. 3 interposed between the electrical grids. Although the examples discussed reference two independent grids for simplicity's sake, these examples can be applied to any number of additional electrical grids. The master synchronization device (MSD) 130, 310 can be any device capable of receiving and processing frequency information (e.g., measurements, deviations, modulations, etc.) from two or more independent electrical grids. In this example, the master synchronization between multiple electrical grids is managed by the IED 310, which may have other functions or can be a dedicated device such as the master synchronization device (MSD) 130 in FIG. 2.

Figure 4:
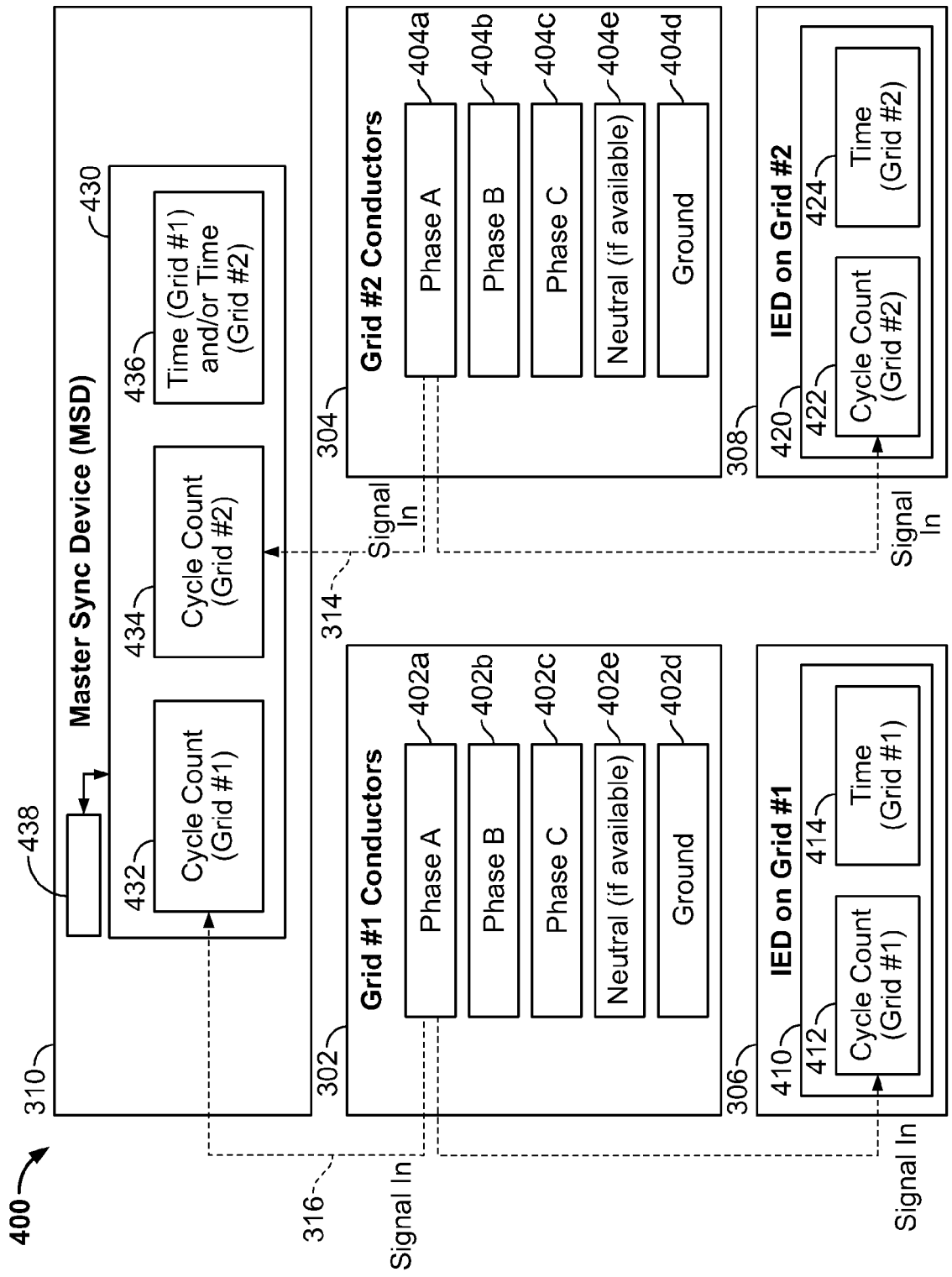
FIG. 4 is a block diagram of the signal inputs from the two electrical grids of the system in FIG. 3 collected by a master synchronization device (MSD) of FIG. 3.

FIG. 4 is an electrical diagram of the electrical utility system 300 in FIG. 3 including the UPS grid 304 and the normal electrical utility grid 302. For exemplary purposes, the electrical utility grid 302 has five conductors, a phase A conductor 402*a*, a phase B conductor 402*b*, a phase C conductor 402*c*, a ground conductor 402*d* and an optional neutral conductor 402*e*. The signal output 316 shown in FIG. 3 corresponds to the phase A conductor 402*a* and can also comprise the phase B and/or C conductors 402*b,c*. Conversely, the UPS grid 304 has five conductors, a phase A conductor 404*a*, a phase B conductor 404*b*, a phase C conductor 404*c*, a ground conductor 404*d* and an optional neutral conductor 404*e*. The signal output 314 in FIG. 3 corresponds to the phase A conductor 404*a*. The system 300 in FIG. 3 includes three IEDs in the electrical utility grid 302 that function as monitoring devices 306 and three IEDs 308 in the electrical utility grid 304 and the master synchronization device (MSD) 310 such as that shown in FIG. 3. The IED 306 is installed on the electrical utility grid 302 and is used for various monitoring functions related to the electrical utility grid 302, while the IED 308 is installed on the UPS grid 304 and is used for various monitoring functions related to the UPS grid 304. The IED 306 includes an internal memory 410 that stores a count of signals in a signal counter 412 and optionally the respective time data table 414. Data in the form of counts measured from one of the conductors 402*a-e* of the electrical utility grid 302 is stored in the signal counter 412 and the respective optional time data table 414. The IED 308 includes an internal memory 420 that includes a signal counter 422 and optionally the respective time data table 424. Data in the form of counts measured from one of the conductors 404*a-e* of the UPS grid 304 is stored in the cycle counter 422 and the time data table 424.

The IED 310 includes a memory 430 storing a signal counter 432, a signal counter 434, and an optional time reference data file 436. An MSD algorithm 438 interfaces with the counters 432 and 434 and the optional time reference data file 436 and performs synchronization of monitored data measured from the electrical grids 302 and 304. It is to be understood that the MSD algorithm 438 only needs one of the conductors of the signal outputs 314 and 316. The signal counter 432 stores a signal count (typically a numeric value) of a periodic occurrence (e.g., zero crossings) associated with the signals from one of the conductors 402*a-e* of the electrical grid 302, while the signal counter 434 stores a signal count of a periodic occurrence associated with the signals from one of the conductors 404*a-e* of the UPS grid 304. The MSD algorithm 438 performs master synchronization functions and receives signal data corresponding to frequency variation data from both grids 302 and 304 that are compiled in the respective signal counters 432 and 434. Because the IED 310 receives input signals from both electrical grids 302 and 304, it is able to synchronization to either or both grids 302 and 304. Each electrical grid 302 and 304 may operate independently, so each electrical grid's frequency and phase may be independent to the other electrical grid. Therefore, the signal counters 432 and 434 are used by the MSD algorithm 438 in the IED 310 to track each respective electrical grid's frequency independently of the other electrical grid. While this example uses cycle counts, it is to be understood that some other periodic occurrence of the input signals (e.g., a count that increments each time a peak current or voltage is detected, or a count that increments every zero-crossing) can be used as well or instead. Further, other signal counters such as the signal counters 432 and 434 can be used for synchronization of additional electrical grids. Each of the cycle counters 432 and 434 act similar to an odometer for its respective electrical grid, incrementing every completed period of the input current or voltage signal from the respective electrical grid. The time interval between each iteration of a specific cycle counter 432 or 434 provides information on the frequency of its respective input signal from the respective electrical grid 302 or 304.

The MSD algorithm 438 shown in FIG. 4 first synchronizes the cycle counter 432 to the other IEDs such as the IED 306*s* located on the first electrical grid 302. The MSD algorithm 438 then synchronizes the cycle counter 434 to the other IEDs such as the IEDs 308 located on the second electrical grid 304.

The MSD algorithm 438 is then able to determine the relationship between events that occur on the first electrical grid 302 with data on the second electrical grid 304 by comparing occurrences on each electrical grid such as cycle counts between the two electrical grids 302 and 304. For example, an event occurring at cycle count 5,421 on the first electrical grid 302 may be of interest. The MSD algorithm 438 determines the corresponding cycle count on the second electrical grid 304 when the cycle count was 5,421 on the first electrical grid 302. The cycle counters 432 and 434 corresponding to electrical grids 302 and 304 respectively may not increment synchronously with each other or at the same moment (due to different phase angles), so the MSD algorithm 438 is employed to track the relationship between signals from each electrical grid. A buffer in the memory 430 (not shown) can be employed to allow historical comparisons of cycle counts or other data between the two electrical grids 302 and 304.

In this example, the IED 310 and MSD algorithm 438 can have the ability to perform the synchronization algorithms described in U.S. Pat. No. 7,684,441, and U.S. Pat. No. 8,024,390, both of which are incorporated by reference, and simultaneously track multiple signal counters in firmware, and gather signal data from hardware coupled to each respective electrical grid. Alternately, multiple MSD devices can be daisy-chained across multiple electrical grids such that if there are three electrical grids, for example, one MSD can link the first and second electrical grids and another MSD can link the second and third electrical grids. The MSD algorithm 438 uses the signal count relationships from the two MSDs to relate the first and third electrical grids. As new IEDs are developed and deployed, it is simple and very inexpensive to provide supplemental master synchronization input(s) that allow data synchronization between at least two grids by such IEDs. Master synchronization firmware can be embedded in such newly developed IEDs, or the firmware of an existing IED can be upgraded to include the MSD algorithm 438. Alternatively, option modules/cards can also be attached to such IEDs in order to provide synchronization for any number of grids.

Figure 5:
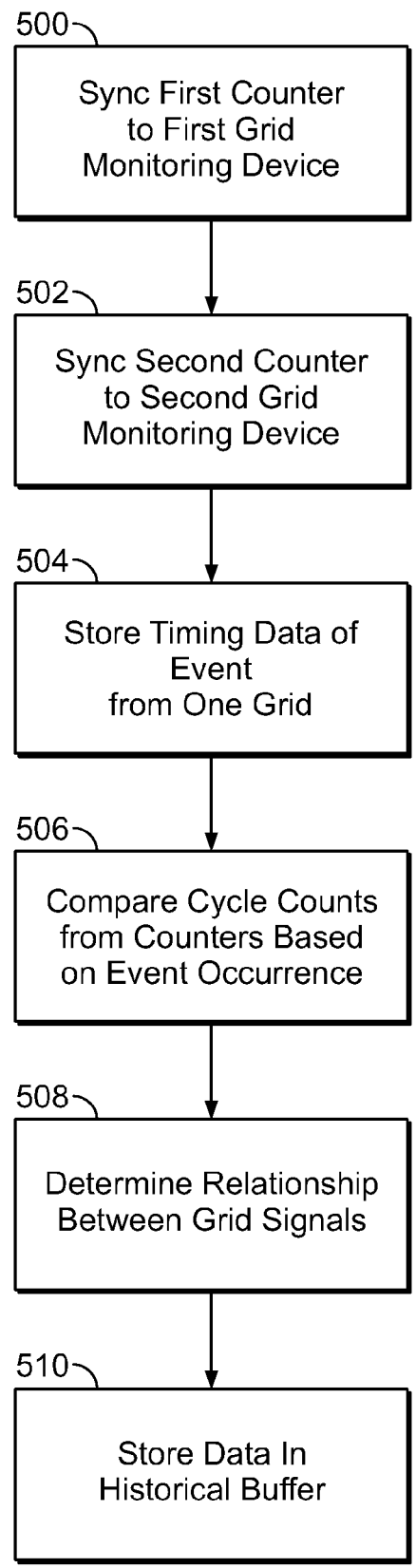
FIG. 5 is a flow chart diagram of a multi-grid synchronization algorithm used by the master synchronization device (MSD) in FIG. 2 and FIG. 4.

The operation of the example process to synchronize data from multiple electrical grids will now be described with reference to FIGS. 3-4 in conjunction with the flow diagram shown in FIG. 5. The flow diagram in FIG. 5 is representative of exemplary machine readable instructions for implementing the algorithm 438 in the IED 310 to synchronize monitored data from multiple electrical grids. In this example, the machine readable instructions comprise an algorithm for execution by: (a) a processor, (b) a controller, and/or (c) one or more other suitable processing device(s). The algorithm may be embodied in software stored on tangible media such as, for example, a flash memory, a CD-ROM, a floppy disk, a hard drive, a digital video (versatile) disk (DVD), or other memory devices, but persons of ordinary skill in the art will readily appreciate that the entire algorithm and/or parts thereof could alternatively be executed by a device other than a processor and/or embodied in firmware or dedicated hardware in a well-known manner (e.g., it may be implemented by an application specific integrated circuit (ASIC), a programmable logic device (PLD), a field programmable logic device (FPLD), a field programmable gate array (FPGA), discrete logic, etc.). For example, any or all of the components of the IED 310 could be implemented by software, hardware, and/or firmware. Also, some or all of the machine readable instructions represented by the flowchart of FIG. 5 can be implemented manually. Further, although the example algorithm is described with reference to the flowchart illustrated in FIG. 5, persons of ordinary skill in the art will readily appreciate that many other methods of implementing the example machine readable instructions can alternatively be used. For example, the order of execution of the blocks can be changed, and/or some of the blocks described can be changed, eliminated, or combined.

FIG. 5 is a flow diagram of a process carried out by a master synchronization algorithm such as the algorithm 240 in FIG. 2 or the MSD algorithm 438 shown in FIG. 4. The MSD algorithm 438 synchronizes a first signal counter such as the cycle counter 432 in FIG. 4 to the synchronized data measured by other IEDs such as the IED 306 located on the electrical grid 302 (500). Once data measured by the intra-grid 302 monitoring devices are automatically synchronized with respect to one another (e.g., their respective signal counters are tracking the same frequency variations in the current or voltage signals being monitored by the intra-grid monitoring devices), the cycle counter 432 iterates with each periodic occurrence of the current or voltage signal being monitored in the electrical grid 302 (e.g., each occurrence of a zero crossing or a peak). The MSD algorithm 438 synchronizes a second signal counter such as the cycle counter 434 to the synchronized data measured by other IEDs such as the IED 308 located on the electrical grid 304 (502). Once the respective counters of the IEDs in the electrical grid 304 are tracking the same frequency variation in the current or voltage signals being monitored by the IEDs in the electrical grid 304, the cycle counter 434 iterates with each periodic occurrence of the current or voltage signal being monitored in the electrical grid 304.

The MSD algorithm 438 may optionally store the time relating to an electrical perturbation occurring on one of the two electrical grids 302 or 304 in FIG. 3 in the time register 436 in FIG. 4 (504). For example, the MSD algorithm 438 stores data indicating that at 1:53:04 PST on Oct. 22, 2008, an electrical perturbation was observed on electrical grid 302 and corresponded to cycle count number 3540. That same electrical perturbation was also observed on electrical grid 304 and corresponded to cycle count number 5432. These two respective cycle counts are then associated with one another, because they coincide with the same temporal activity on both electrical grids. The MSD algorithm 438 is able to determine the relationship between events that occur on one electrical grid with data on the other electrical grid by comparing and tracking the cycle counts between the two electrical grids (506). For example, if the MSD algorithm 438 uses cycle counts, it will associate the time of an event in the electrical grid 302 taken from the time data table 436 to a first cycle count from the electrical grid 302. The MSD algorithm 438 interrelates a second cycle count on electrical grid 304 such as from the counter 434 to when the cycle count corresponding to the event occurred on electrical grid 302. The MSD algorithm 438 is therefore able to determine the relationship between electrical grid signals of the electrical grids 302 and 304 based on the two counters (508). The MSD algorithm 438 can store the data in a buffer to allow historical comparisons of cycle counts or other data between the two electrical grids 302 and 304 (510).

While particular embodiments and applications of the present invention have been illustrated and described, it is to be understood that the invention is not limited to the precise construction and compositions disclosed herein and that various modifications, changes, and variations can be apparent from the foregoing descriptions without departing from the spirit and scope of the invention as defined in the appended claims.

What is claimed is:

1. A method of automatically associating data measured by monitoring devices that monitor independent alternating current electrical grids, comprising:

receiving, at a master synchronization device, first signal data from a first set of power monitoring devices that are monitoring current or voltage outputs for power consumption from a first electrical grid, the first signal data representing at least frequency variations in energy supplied by the first electrical grid and the values of current or voltage outputs from the first set of power monitoring devices, the frequency variations of the first signal data being measured by respective ones of the first monitoring devices for a predetermined number of occurrences;

automatically synchronizing, in the master synchronization device, the frequency variations measured by each of the first monitoring devices and producing a first occurrence counter that counts a periodic occurrence in the synchronized frequency variations associated with the first monitoring devices;

receiving, at the master synchronization device, second signal data from a second set of power monitoring devices that are monitoring current or voltage outputs for power consumption from a second electrical grid, the second electrical grid independent of the first electrical grid and producing alternating current signals that are electrically isolated from alternating current signals produced by the first electrical grid, the second signal data representing at least frequency variations in energy produced by the second electrical grid and the values of current or voltage from the second set of power monitoring devices, the frequency variations of the second signal data being measured by respective ones of the second monitoring devices for a predetermined number of occurrences at a time coincident with a time that the first set of monitoring devices measure the frequency variations in the energy supplied by the first electrical grid;

automatically synchronizing, in the master synchronization device, the frequency variations measured by each of the second monitoring devices and producing a second occurrence counter that counts a periodic occurrence in the synchronized frequency variations associated with the second monitoring devices;

automatically comparing, in the master synchronization device, a first count of the first occurrence counter with a first count of the second occurrence counter, wherein the first count of the first occurrence counter and the first count of the second occurrence counter temporally correspond to an electrical event in the first electrical grid and the second electrical grid; and determining a relationship between the first signal data and the second signal data by associating the first count of the first occurrence counter and the first count of the second occurrence counter to collect the first and second signal data and the first and second occurrence counters for analysis of the first and second signal data independent of changing power supplied by the first and second electrical grids.

2. The method of claim 1, wherein the alternating current produced by the first electrical grid is electrically isolated from the alternating current produced by the second electrical grid via an intervening uninterruptible power supply, a motor-generator set, or a diesel-generator set.

3. The method of claim 1, wherein the number of occurrences associated with the first monitoring devices is a number of cycles of the alternating current signals produced by the first electrical grid, and the number of occurrences associated with the second monitoring devices is a number of cycles of the alternating current signals produced by the second electrical grid.

4. The method of claim 1, wherein the first and second electrical grids both supply alternating current signals to a data center.

5. A power monitoring device for associating data between a first and second electrical grid, the second electrical grid producing alternating current signals that are independent of and electrically isolated from alternating current signals produced by the first electrical grid, the power monitoring device comprising:
a controller;
a first monitoring device interface coupled to a first monitoring device in the first electrical grid, the first monitoring device monitoring current or voltage outputs for power consumption from the first electrical grid;
a second monitoring device interface coupled to a second monitoring device in the independent and electrically isolated second electrical grid, the second monitoring device monitoring current or voltage outputs for power consumption from the second electrical grid;
a first counter corresponding to data counts of occurrences in energy supplied by the first electrical grid and measured by the first monitoring device;
a second counter corresponding to data counts of occurrences in energy supplied by the second electrical grid and measured by the second monitoring device at a time coincident with a time that the occurrences from the first electrical grid are measured by the first monitoring device; and
a synchronization monitoring algorithm automatically synchronizing the first and second counters by associating a data count from the first counter with a data count from the second counter with a time corresponding to the occurrence of an electrical event on both the first and the second electrical grids to collect the first and second signal data and the first and second occurrence counters for analysis of the first and second signal data independent of changing power supplied by the first and second electrical grids, the synchronization monitoring algorithm being used to determine a relationship between the first counter and the second counter.

6. The device of claim 5, wherein the alternating current produced by the first electrical grid is electrically isolated from the alternating current produced by the second electrical grid via an intervening uninterruptible power supply, a motor-generator set, or a diesel-generator set.

7. The device of claim 5, wherein the data counts of occurrences from the first electrical grid is a number of cycles of the alternating current signals produced by the first electrical grid, and the data counts of occurrences from the second electrical grid is a number of cycles of the alternating current signals produced by the second electrical grid.

8. The device of claim 7, wherein the number of cycles associated with the first electrical grid represents a number of zero crossings by a current or voltage signal monitored by the first monitoring device in the first electrical grid.

9. The device of claim 5, wherein the first or second monitoring device interface are mounted on a card module detachable from the controller, and the master synchronization algorithm is stored in a memory.

10. The device of claim 5, wherein the first and second monitoring device interface are mounted on a card module detachable from the controller, and the master synchronization algorithm is stored in a memory coupled to the controller.

11. A non-transitory machine readable medium having stored thereon instructions for associating data measured from a first and a second electrical grid, the second electrical grid producing alternating current signals that are independent of and electrically isolated from alternating current signals produced by the first electrical grid, comprising machine executable code, which when executed by at least one machine, causes the machine to:
receive first signal data from a first power monitoring device monitoring current or voltage outputs for power consumption from the first electrical grid, the first signal data representing frequency variations in energy supplied by the first electrical grid and the values of current or voltage outputs from first power monitoring device, the frequency variations of the first signal data being measured by the first monitoring device for a predetermined number of occurrences;
receive second signal data from a second power monitoring device monitoring current or voltage outputs for power consumption from the independent and electrically isolated second electrical grid, the second signal data representing at least frequency variations in energy produced by the second electrical grid and the values of current or voltage from the second set of power monitoring devices, the frequency variations of the second signal data being measured by the second monitoring device for a predetermined number of occurrences at a time coincident with a time that the first monitoring device measures the frequency variations in the energy supplied by the first electrical grid;
determine a first occurrence count corresponding to a perturbation measured by the first monitoring device;
determine a second occurrence count corresponding to the perturbation measured by the second monitoring device;
associate the first occurrence count with the second occurrence count based on a time measurement of the perturbation occurring in both the first and the second electrical grids; and
determine a relationship between the first signal data and the second signal data using the associated first and second occurrence counts to collect the first and second signal data and the first and second occurrence counters for analysis of the first and second signal data independent of changing power supplied by the first and second electrical grids.

12. The machine readable medium of claim 11, wherein the alternating current produced by the first electrical grid is electrically isolated from the alternating current produced by the second electrical grid via an intervening uninterruptible power supply, a motor-generator set, or a diesel generator set.

13. The machine readable medium of claim 11, wherein the number of occurrences associated with the first monitoring devices is a number of cycles of the alternating current signals produced by the first electrical grid, and the number of occurrences associated with the second monitoring devices is a number of cycles of the alternating current signals produced by the second electrical grid.

14. The method of claim 3, wherein the first electrical grid is defined as part of an electrical utility grid interconnection, and wherein the second electrical grid is electrically isolated from the first electrical grid by an intervening uninterruptible power supply, a motor-generator set, or a diesel-generator set, and wherein the first or the second electrical signals or both supply alternating current signals to a data center.

15. The method of claim 1, further comprising:
associating the first count of the first occurrence counter and the first count of the second occurrence counter in a first entry of a time data table;
automatically comparing, in the master synchronization device, a second count of the first occurrence counter with a second count of the second occurrence counter, wherein the second count of the first occurrence counter and the second count of the second occurrence counter temporally correspond to a second electrical event in the first electrical grid and the second electrical grid;
associating the second count of the first occurrence counter and the second count of the second occurrence counter in a second entry of the time data table; and
comparing the historical relationship between the first signal data and the second signal data through the first entry and the second entry of the time data table.

16. The method of claim 15, further comprising:
continuing to compare the historical relationship between the first signal data and the second signal data through subsequent entries of the time data table.

17. The device of claim 5, wherein the synchronization monitoring algorithm is configured to automatically synchronize the first and second counters by associating a second data count from the first counter with a second data count from the second counter with a time corresponding to the occurrence of a second electrical event on both the first and the second electrical grids;
the device further comprising:
a time data table for storing a first entry corresponding to the association of the data count from the first counter with the data count from the second counter corresponding to the electrical event and a second entry corresponding to the association of the second data count from the first counter with the second data count from the second counter corresponding to the second electrical event;
wherein the synchronization monitoring algorithm is configured to compare the historical relationship between the first counter and the second counter through the first entry and the second entry of the time data table.

18. The device of claim 17, wherein the synchronization monitoring algorithm is configured to continue comparing the historical relationship between the first counter and the second counter through subsequent entries in the time data table.

19. The machine readable medium of claim 11, further comprising instructions that cause the at least one machine to:
store the association of the first occurrence count and the second occurrence count in a first entry of a time data table;
determine a third occurrence count corresponding to a second perturbation measured by the first monitoring device;
determine a fourth occurrence count corresponding to the second perturbation measured by the second monitoring device;
associate the third occurrence count with the fourth occurrence count based on a time measurement of the second perturbation occurring in both the first and the second electrical grids;
store the association of the third occurrence count and the fourth occurrence count in a second entry of the time data table; and
compare the historical relationship between the first signal data and the second signal data through the first entry and the second entry of the time data table.

20. The machine readable medium of claim 19, further comprising instructions that cause the at least one machine to:
continue to compare the historical relationship between first signal data and the second signal data through subsequent entries of the time data table.

* * * * *